United States Patent [19]

Williams

[11] 4,312,225

[45] Jan. 26, 1982

[54] DEVICES FOR DETECTING LEVELS

[76] Inventor: David M. Williams, 16 Sedop Close, Saffron Walden, Essex, England

[21] Appl. No.: 124,225

[22] Filed: Feb. 25, 1980

[30] Foreign Application Priority Data

Mar. 3, 1979 [GB] United Kingdom ............... 07552/79

[51] Int. Cl.³ ............................................... G01F 23/10

[52] U.S. Cl. ....................................... 73/308; 340/617

[58] Field of Search ................. 73/308, 313, 318, 321, 73/319; 340/617

[56] References Cited

U.S. PATENT DOCUMENTS

| | | | |
|---|---|---|---|
| 926,251 | 6/1909 | Harding | 73/308 |
| 3,099,158 | 7/1963 | Barker, Jr. | 73/321 |

FOREIGN PATENT DOCUMENTS

| | | | |
|---|---|---|---|
| 881389 | 4/1943 | France | 340/617 |
| 631227 | 12/1961 | Italy | 73/321 |
| 439191 | 12/1935 | United Kingdom | 73/308 |
| 882087 | 11/1961 | United Kingdom | 73/321 |

*Primary Examiner*—Donald O. Woodiel
*Attorney, Agent, or Firm*—Donald K. Wedding

[57] ABSTRACT

A device is described for detecting the level of the material within a container such as a hopper comprising a cord (18) for suspending a thimble (38) from a balance arm (22) which in turn is suspended through the intermediary of an inclination sensitive switch (26).

Modifications are illustrated in which the cord is suspended through a sealed aperture in a lid (40).

Another embodiment of the invention comprises a cord (66) for suspending a thimble (38) from a balance arm (62) which is balanced by means of an adjustable tension spring (68) and when pivoted so as to actuate a switch (76).

2 Claims, 3 Drawing Figures

DEVICES FOR DETECTING LEVELS

DESCRIPTION

1. Field of Invention

This invention concerns devices for determining the level of a material such as a finely divided particulate material and the like in hoppers and like containers.

2. Background to the Invention

My British patent application No. 2068/76 describes a device which can be suspended in a hopper or like container for sensing when a particulate material or fluid in the hopper or other container has reached a given level therein. The switch contacts are wholly contained within a sealed housing and in the most common version of the electrical switch described and claimed in my co-pending application, the sealed housing is suspended at the lower end of a cable or the like and a switch is of such a design that electrical contacts within the housing are only opened when the housing hangs completely vertically. Any tendency for the housing to tilt will cause the switch contacts to be closed and an electrical circuit to be completed thereby sounding an alarm and/or shutting off the supply of particulate material to the hopper or like container. Whilst the switch described and claimed in my co-pending Application No. 2068/76 has proved to be very successful and performs reliably in almost any environment, the switch can become damaged when hanging inside a large hopper into which bulk material is tipped or delivered as a result of the outer casing of the switch being dashed against the inside wall of the hopper. Furthermore, despite the fact that the switch contacts are wholly contained within a sealed housing, there is always the fear that the housing may become damaged or unsealed in some way during use in what is an explosive environment so that the next time electrical arcing occurs between the switch contacts an explosion may result. To this end it has for some time appeared desirable to be able to remove the switch assembly entirely from the inside of a container and to hang in the container a device which if damaged or broken is readily and cheaply replaceable thereby keeping the switch assembly itself remote from the environment within the hopper or other container. This has the added advantage that should any breakdown occur the electrical contacts are not hanging within the dangerous environment within the hopper but are or can be well above the hopper in the relatively safer environment outside the hopper.

OBJECT OF THE INVENTION

It is an object of the present invention to provide an improved level detecting device for detecting levels of particulate material and the like in hoppers and the like which does not require a device containing electrical switch contacts to be suspended within the hopper or other container.

THE INVENTION

According to present invention a device for detecting the level of a material within a container such as a hopper comprises an elongate cord suspended within the container from a fixed point thereabove, the length of the cord being selected so that it reaches to just below the level in the container at which the presence (or absence) of material within the container is to be detected and electrical switch means responsive to the tension in the cords and operable by the change in tension brought about either as the lower end of the cord is initially buried by a rising level of the material within the container or as the lower end of the cord becomes exposed as the level of material within the container drops.

The cord may be attached to the fixed point through a tension spring and the junction between the cord and the spring may be provided with an actuator for operating an electrical switch as the tension in the spring increases or decreases (as the case may be).

Alternatively and preferably the cord is attached to one end of a lever which is pivoted at a point along its length nearer to one end than the end to which the cord is attached and means is attached to the other end of the lever for balancing out the turning moment about the axis of pivoting produced by at least the hanging weight of the cord and switch means is provided which is operable from one condition to another condition in response to the change in the turning moment about the axis of pivoting of the lever brought about by the lower end of the hanging cord becoming buried in a rising level of material within the container or as the end of the cord becomes exposed as the level of material within the container drops.

The means for balancing out the turning moment is conveniently a spring with means for adjusting the tension therein so as to allow the pivoted lever to be pre-set to a correct initial inclination.

In a particularly preferred embodiment, the cord is attached to a fixed support above a hopper and passes through an aperture at one end of a rigid bar which is fixed to the lower end of the housing of an electrical switch of the type described in my co-pending British Application No. 2068/76, the junction between the lower end of the switch housing and the bar being located at a point intermediate the two ends of the bar which is nearer to one end of the bar than the end through which the cord passes and means is provided at the end of the bar remote from that through which the cord passes to allow the initial condition of the bar to be set up and the weight component of the hanging cord compensated by the addition of weights until the switch just hangs vertically. Any change in tension in the cord subsequent to the initial setting up will then be detected since the action of the switch described in my co-pending Application 2068/76 is to close (or open as the case may be) electrical contacts within the housing of the switch as soon as the latter is deflected from the vertical.

The lower end of the cord (irrespective of the switch arrangement at the upper end thereof) may have a weight or hood attached thereto which provides additional anchorage within the material in the hopper so that the point at which the lower end of the cord becomes buried or is first exposed is even more clearly defined.

Where the hopper is open or partially open at its upper end, the cord can simply hang through the open upper end of the container or through an opening in the upper end thereof.

Where the hopper is of the sealed variety the invention may still be used but in this case the cord must be sealed into the roof of the hopper. Since the change in tension in the cord is very small it is not possible to under normal circumstances pass the cord through an O-ring seal or the like since the friction between the cord and seal would be too great and would mask any changes of tension in the cord. Instead the invention envisages the provision of an aperture in the roof of an otherwise sealed hopper or container having stretched thereacross a flexible membrane of a material which is compatible with the contents of the hopper or other container and has attached thereto on the external surface a first length of cord and on its internal surface a second length of cord which latter hangs down inside the hopper or other container to the desired depth therewithin and the first and second lengths of cord together make up the length of cord previously referred to, the upper end of the first length of cord being attached to the fixed point above the hopper. Although the membrane will introduce a certain degree of stiffness into the system which was not there before, this can be compensated for by providing increased mechanical advantage in the switch operating mechanism so that an even smaller change in tension in the cord will bring about operation of the switch. The invention will now be described by way of example with reference to the accompanying drawings.

IN THE DRAWINGS

FIG. 1 is a diagrammatic cross-section through a hopper fitted with a level sensing device constructed as one embodiment of the invention, FIG. 2 is a diagrammatic cross-section through the upper end only of a hopper which is sealed by a lid at its upper end and illustrates how the invention may be applied to such a hopper and FIG. 3 is a diagrammatic cross-section through the upper end of another hopper fitted with another embodiment of the present invention.

DETAILED DESCRIPTION OF THE DRAWINGS

Figure 1:
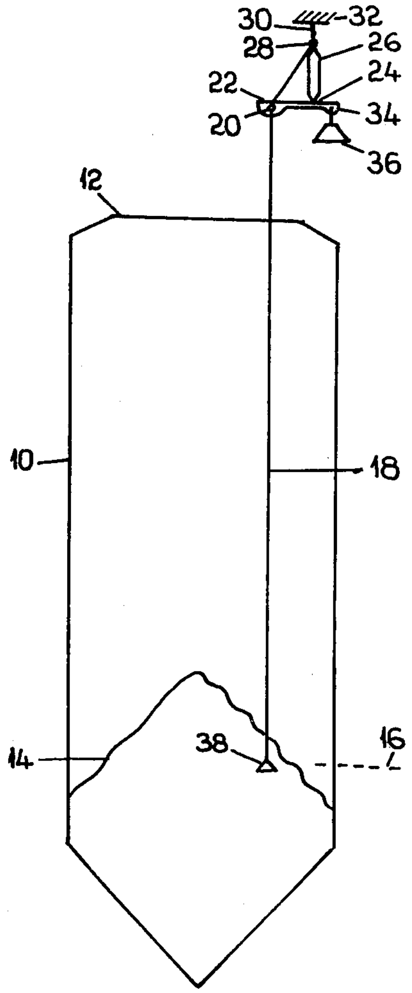

In FIG. 1 a hopper 10 the upper end of which is open at 12 is shown in cross-section partially filled with a finely divided particulate bulk material 14. The material 14 is extracted from the hopper 10 via an outlet (not shown) at the lower end of the hopper and it is a common requirement to know when the level of the material 14 in the hopper 10 has reached a level such as indicated by dotted line 16 in FIG. 1. The previous methods of detecting when the level of the material 14 has fallen to this level have involved suspending a switch such as the type of switch described in my co-pending British application No. 2068/76 in the hopper and whilst the operation of such a switch is perfectly reliable in practice, the tipping of large quantities of material into the hopper has occasionally resulted in damage occurring to the suspended switch and the present invention obviates this possibility by removing the sensitive switch mechanism from within the hopper and suspending therein a cord designated by reference numberal 18.

As shown in FIG. 1 the cord passes through an aperture 20 in one end of a suspended lever or balance arm 22 which is rigidly attached at 24 to the lower end of a switch housing 26 of the type described in my co-pending Application 2068/76. The upper end of the housing 26 includes an eye bolt 28 which is attached via link 30 to a beam or other fixed structure 32.

The opposite end of the beam 22 includes an aperture 34 suspended from which is a weight 36.

The detector is set up by first of all suspending the cord 18 into the hopper and adjusting the weight 36 until the beam 22 is horizontal so that the switch housing 26 hangs vertically. In this condition the switch contacts in the switch housing 26 are open. The hopper is then filled in a conventional manner. Upon being filled the particulate material applies a drag to the cord 18 which immediately causes the switch housing 26 to deviate from the vertical and the switch contacts to close and the housing 26 will remain thus deviated all the time that the hopper is filled above the level 16.

As the material 14 is withdrawn from the hopper, so the level of the material within the hopper drops until it reaches the position as shown in FIG. 1. Continued withdrawal of the material 14 from the hopper will cause the lower end of the cord 18 to suddenly become free from the material and the downward drag on the cord 18 will be removed. The tension in the cord 18 will reduce and in turn this will allow the suspended beam 22 to become balanced once again causing the switch housing 26 to revert to the vertical. In this condition the switch contacts in the switch housing 26 open and an electrical circuit responsive to the condition of the switch contacts will produce an alarm signal or control signal as the case may be to indicate that the level of the material within the hopper has reached the level 16.

As shown in FIG. 1, the lower end of the cord 18 may have attached thereto a small thimble 38 or a small weight. The purpose of this is to facilitate the dropping of the cord into the hopper and also to provide an even better anchorage of the lower end of the cord within the material 14 but it has been found in practice that the weight or thimble 38 serves no particularly useful purpose with regard to increasing the drag on the cord which is brought about solely as a result of the trapping of the lower end of the cord in the material and the subsequent weight component of material acting on the cord 18 in a manner so as to increase the tension therein.

The arrangement shown in FIG. 1 is suitable for any hopper or container in which the upper end is open or has at least one opening therein through which the cord 18 can extend. The The arrangement is thus suitable for use with hoppers contained within a barn or warehouse or the like but is not particularly suitable for hoppers and containers which are situated outside a building. Such containers are normally provided with a weatherproof cover or lid which for obvious reasons must not be apertured at least on a permanent basis. To this end the arrangement as shown in FIG. 1 must be modified to allow it to be fitted to a hopper the upper end of which has to be permanently closed to seal the contents of the hopper. (It will be appreciated that the sealing of the hopper or container may be as important to keep external elements such as rain and snow out of the hopper as to keep the contents of the hopper within as in the case of explosive mixtures or dusty materials or materials which give off harmful gases or vapours.)

Figure 2:
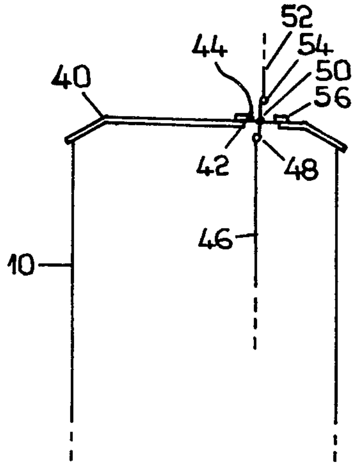

Referring specifically to FIG. 2, a sealing cover 40 is shown fitted to the upper end of a hopper 10. The cover 40 is formed with an aperture 42 which is covered by a flexible membrane 44 of a material which serves to seal the contents of the interior of the hopper 10 and does not react therewith but which is flexible so that tension in a cord 46 suspended from a hook 48 attached to a central fitting 50 on the membrane 44 will be transmitted across the membrane into a second cord 52 attached to a second hook 54 which extends on the other side of the fitting 50. The single cord 18 of FIG. 1 is thus replaced by two cords 46 and 52 joined across the membrane 44.

The membrane is typically held in place by means of a ring such as 56 which may for example be screwed onto a flange (not shown) around the aperture 42 or screwed into the aperture 42 whichever is more convenient.

Figure 3:
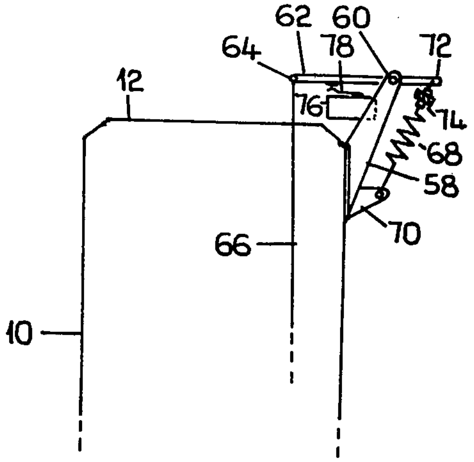

The remainder of the mechanism of the level sensing system of FIG. 2 may for example be the same as shown in FIG. 1. It is to be understood that although a preferred embodiment of the present invention incorporates a trembler switch of the type described in my co-pending Application 2068/76, it is not necessary to use that type of switch and an alternative arrangement which simply uses a standard microswitch is shown in FIG. 3. Here a hopper 10 is fitted at its upper end with a first mounting bracket 58 which provides a pivot support 60 for a rigid arm or beam 62 which partly overhangs the open end of the hopper 12. The beam is pivoted at a point intermediate its two ends which is nearer to one end than the other such that the longer section of the beam extends over the hopper 10.

To this end 64 is attached a cord 66 which extends down into the hopper in the same way as the cord 18 of FIG. 1.

To the other end of the arm or beam 62 is attached a helical tension spring 68 the other end of which is secured to a second mounting bracket 70. The upper end of the spring 68 is attached to the end 72 of the arm or beam 62 through an element of adjustable length having for example a knurled nut 74 which can be rotated so as to adjust the overall length of the device and thereby adjust the initial tension in the spring. In this way the tension in the spring 68 can be adjusted so as to just compensate for the hanging weight of the cord 66 so that the arm or beam 62 occupies a generally horizontal mode.

Below the arm or beam 62 is located a microswitch 76 having an actuating arm 78. If the arm or beam 62 pivots about the pivot 60 in an anti-clockwise direction the actuator 78 is depressed and the micro-switch opened or closed (as the case may be) thereby completing or interrupting an electrical circuit. The change in in the electrical circuit can be used to generate an alarm or indicating signal or a control signal to either simply indicate that the material in the hopper has reached a particular level or to actually shut off the supply of material to the hopper or from the hopper.

General

Although the elongate member which is suspended into the hopper has been described as a cord it is to be understood that this can be of any suitable form and material from a steel hawser to a fine thread typically of plastics material such as Nylon (Registered Trade Mark) and the invention is in no way limited to any particular type of material being used for the cord.

I claim:

1. A device for detecting the level of the material within a container comprising an elongated cord suspended within the container from a fixed point thereabove, the length of the cord being selected so that it reaches to just below the level in the container in which the presence (or absence) of material within the container is to be detected;

electrical switch means which is sensitive to changes in inclination thereof and is contained within a housing and is operable to respond to changes in tension in the cord brought about either as the lower end of the cord is initially buried by a rising level of the material within the container or as the lower end of the cord becomes exposed as the level of the material in the container drops;

a rigid bar fixed to the lower end of the housing of the electrical switch, the junction between the lower end of the switch housing and the bar being located at a point intermediate the two ends of the bar;

an aperture in one end of the bar through which the cord passes; means provided at the other end of the bar to allow the initial condition of the bar to be set up and the weight component of the hanging cord compensated by the addition of weights until the switch just hangs vertically;

the junction between the switch housing and the bar being located further from the end through which the cord passes than the other end of the bar.

2. A device for detecting the level of the material within a container comprising (a) an aperture in a roof member of the container;

(b) a flexible membrane stretched across the aperture;

(c) an elongated cord attached to the underside of the membrane and suspended within the container therefrom the length of the cord being selected so that it reaches to just below the level in the container in which the presence (or absence) of material within the container is to be detected;

(d) electrical switch means above the membrane, and (e) a cord joining the electrical switch to the membrane such that the electrical switch is responsive to the tension in the cord joining the switch to the membrane and is operable by changes in tension brought about either as the lower end of the first mentioned cord is initially buried by a rising level of the material within the container or as the lower end of the cord becomes exposed as the level of material in the container drops.

* * * * *